United States Patent [19]

Bulfer

[11] 3,935,394
[45] Jan. 27, 1976

[54] NETWORK ROUTING AND CONTROL ARRANGEMENT

[75] Inventor: Andrew Frederick Bulfer, Oceanport, N.J.

[73] Assignee: Bell Telephone Laboratories, Incorporated, Murray Hill, N.J.

[22] Filed: Oct. 4, 1974

[21] Appl. No.: 512,256

[52] U.S. Cl. ............................................ 179/18 ES
[51] Int. Cl.² ........................................... H04Q 3/54
[58] Field of Search .......... 179/18 EA, 18 ES, 18 G, 179/18 GE, 18 FC, 22, 18 EB

[56] References Cited
UNITED STATES PATENTS

| | | | |
|---|---|---|---|
| 3,576,398 | 4/1971 | Dejean et al. ................... | 179/18 EA |
| 3,613,089 | 10/1971 | Karp ................................. | 340/172.5 |

Primary Examiner—Thomas W. Brown
Attorney, Agent, or Firm—D. E. Nester

[57] ABSTRACT

A system is disclosed for selecting and establishing connections through a two-stage concentrator network utilizing path selection circuitry adapted to minimize blocking. This circuitry operates to select a path through the second-stage switch which is the least congested (i.e., has the most idle output lines). More specifically, "congestion" information is generated from "outlet" information specifying the idle/busy status of the outlets or terminals of the second-stage switches. This congestion information is logically combined with link information, specifying the idle/busy status of link paths interconnecting the stages, to ascertain if a path is available through one of the least congested second-stage switches. If a path is available, an idle outlet is selected on a least-congested second-stage switch, and then a connection is completed to the selected idle outlet.

5 Claims, 5 Drawing Figures

NETWORK ROUTING AND CONTROL ARRANGEMENT

FIELD OF THE INVENTION

This invention pertains to selecting and establishing paths through connecting networks and, more specifically, to arrangements for controlling the establishment of paths through two-stage concentrator networks.

BACKGROUND OF THE INVENTION AND PRIOR ART

When a system ascertains that a connection must be established from a communication path through a network, it is desirable if the connection is completed over a path which tends to minimize the blocking potential for future connections. It is apparent that each time one connection is completed through the network, this increases the probability that future connections will be blocked. However, certain path selection and routing arrangements tend to minimize this blocking and thereby, tend to increase the capacity of a network.

Conceptually, there are two distinct phases in the completion of a connection through a network. The first phase is known as a path hunt. In the path hunt phase, all accessible idle paths through the network are ascertained. In other words, all paths which could be utilized to complete a connection are ascertained. The second phase is known as routing and entails the selection of one of the available paths ascertained in the first phase. The connection is then established through the network over the one selected path.

In prior art systems, several routing techniques have been utilized. One technique is known as "random-selection" routing and, in this technique, a selected path is chosen at random from all available usable paths. This technique is effective in that it tends to equalize the wear of equipment in the network.

In another prior art routing technique, herein termed a "most-busy" technique, connections are completed through the most-congested switches or nodes which can handle the connection. For a discussion of this technique see, for example, page 1373 et seq. of the November, 1966, issue of *Bell System Technical Journal*. This technique is intuitively based upon the supposition that since the probability of completing a call through a highly congested switch is very low, if a path is now available through such a switch, the path should be utilized because for a succeeding call the probability of using this switch is also very low.

Still another prior art routing technique is known as "sequential hunt" or "packing" and entails the selection of the first available usable route in a predetermined sequence of all possible routes.

It is an object of this invention to optimally route and establish connections through a two-stage concentrator network in a manner to minimize blocking for future connections.

SUMMARY OF THE INVENTION

I have discovered that connections can be optimally established to minimize blocking in a two-stage concentrator network by utilizing the paths through the least congested second-stage switches. The least-congested switches are defined to be those with the greatest number of idle outlets or terminals.

More specifically, in accordance with this one illustrative embodiment of my invention, each stage of the two-stage network comprises a plurality of switches which are interconnected by links. A link map is generated which specifies the idle links associated with each of the first-stage switches. A second outlet map is generated which specifies the idle outputs for each of the second-stage switches. A "congestion" map is also generated which indicates the number of idle outlets for each second-stage switch.

When a service request is detected over a communication line terminated in the network, information is obtained specifying the idle-busy status of the links connected to the first-stage switch on which this line is terminated. This obtained information is then logically compared with congestion information retrieved from the congestion map to ascertain the least congested second-stage switch over which the connection cannot be established. More specifically, a logical comparison is instituted to ascertain if the connection can be established over the second-stage switches with N idle outlets, in which N denotes the number of outlets on each second-stage switch. If not, a second logical comparison is instituted to ascertain if the connection can be established over the second-stage switches with N-1 idle outlets. If necessary, further successive comparisons are instituted until finally a comparison is instituted to ascertain if the connection can be established over the second-stage switches with one idle outlet. Upon ascertaining that a "least congested" second-stage switch can be utilized, an idle outlet on that switch is then selected.

Based upon information identifying the first-stage switch, the derived information specifying the selected least-congested second-stage switch and the derived information specifying the selected outlet on the selected second-stage switch, the network is controlled to physically establish the connection through the network.

In accordance with a feature of my invention, connections are established through the least-congested second-stage switches of a two-stage concentrator to minimize blocking.

In accordance with another aspect of my invention a congestion map is derived from a map specifying the idle outlet status of the second-stage switches.

In accordance with another aspect of my invention a sequence of logical comparisons are instituted to identify the class of second-stage switches with the most idle outlets having idle usable links connected thereto.

BRIEF DESCRIPTION OF THE DRAWING

The foregoing as well as other objects, features, and advantages of my invention will be more apparent from a description of the drawing in which.

DESCRIPTION

Figure 1:
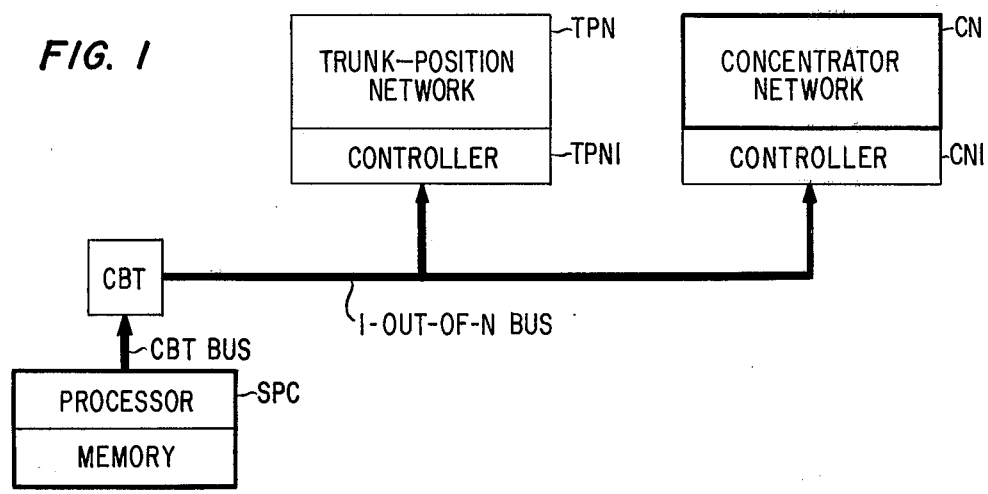
FIG. 1 is a block diagram illustrating the environment in which the concentrator network is utilized and controlled.

FIG. 1 illustrates the environment in which the two-stage concentrator network CN is utilized and controlled.

More specifically, the concentrator network is an additional switching network which is added to a telephone system known as TSPS No. 1, which system is utilized to provide centralized automated operator service primarily on long-distance telephone calls. TSPS No. 1 is comprehensively described in the December 1970, issue of the *Bell System Technical Journal*. More specifically, the communication bus system illustrated in FIG. 1 corresponds to FIG. 1 on page 2563 of the above-mentioned BSTJ.

To elaborate, processor SPC in FIG. 1 comprises duplicated processing units for operating in accordance with a stored program to service telephone calls. Processor SPC indirectly receives dialed digits and controls trunk position network TPN to establish connections from telephone trunks associated with calling stations to operator positions which are not illustrated. Translator CBT in FIG. 1 provides logic for decoding orders from the SPC received over the CBT bus and for providing them to network controller TPN1 and network controller CN1 for controlling the establishment of connections in the network associated with each of these controllers. The circuitry of the network controllers may correspond to that shown on page 2576 of the above-mentioned BSTJ. These are well-known controllers including pulsers for controlling the operation of ferreed switches to establish network connections.

Concentrator network CN is a two-stage network which has been added to the 1-out-of-N bus of the TSPS No. 1 System. Controller CN1 controls the establishment of connections in the concentrator network in accordance with commands received from processor SPC and translator CBT.

Figure 2:
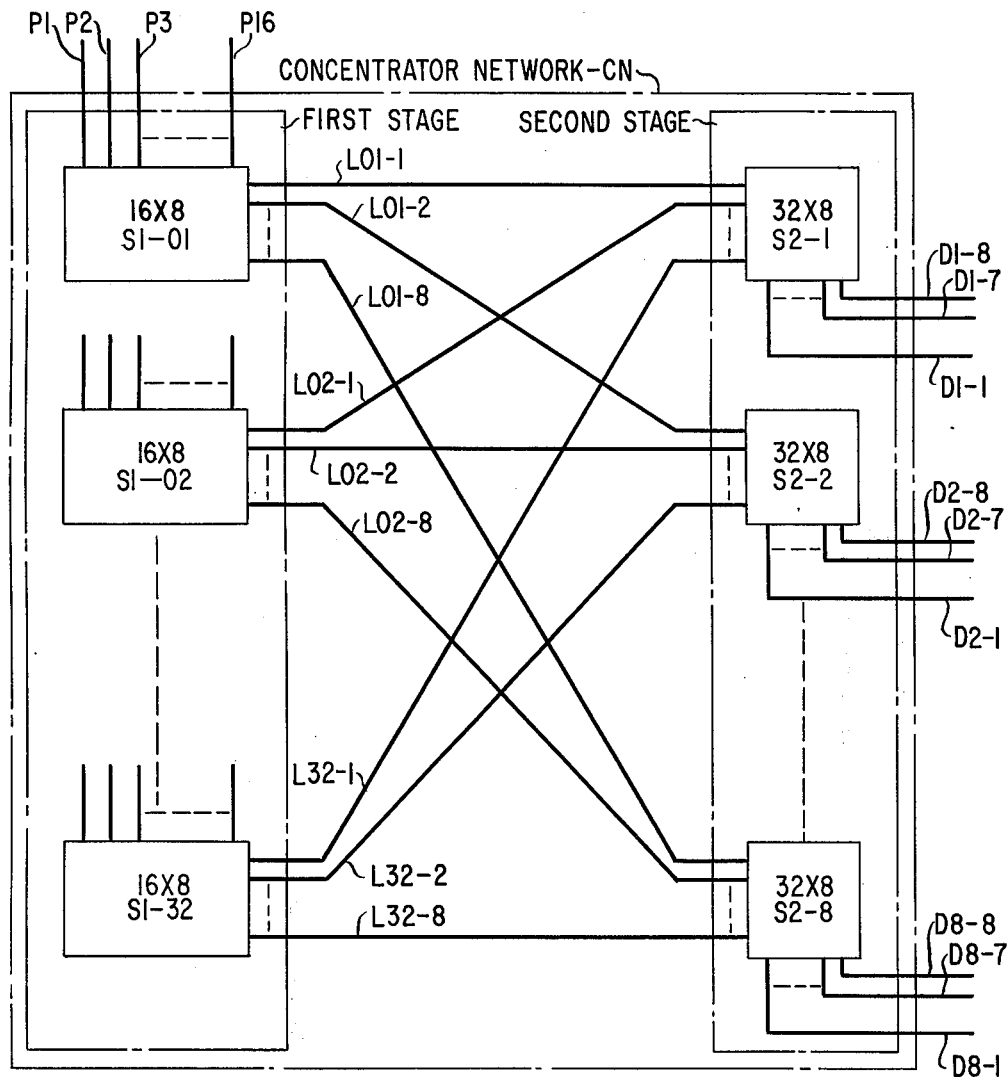
FIG. 2 illustrates in greater detail the various switches and links in the concentrator network illustrated in FIG. 1.

FIG. 2 illustrates in greater detail the topology of concentrator network CN. Network CN comprises 32 first-stage switches designated S1-01 to S1-32. The second digit which is a 1 indicates that these are first-stage switches and the two digits following the hyphen identify the particular first-stage switch. Thus designation Si-o2 identifies first-stage switch number two. Network CN also comprises eight second-stage switches designated S2-1 to S2-8. Network CN is utilized to establish connection from a communication path terminated on a first-stage switch to an idle outlet on a second-stage switch. This is known as a "point-to-group" connection.

Each of the stages comprises well-known individual reed switches comprised of individual contacts known as ferreeds. Each of the first-stage switches includes 128 (i.e., 16 × 8) ferreeds for selectively establishing connections from any of sixteen input lines such as P1-P16 to any of 8 interstage links terminated thereon such as L01-1 to L01-8. Each second-stage switch comprises 256 (i.e., 32 × 8) ferreeds for selectively establishing connections from any of 32 links to any of 8 output leads. For example, switch S2-1 can be controlled to establish connections from any of 32 links L01-1, L02-1...L32-1 to any of the 8 outputs D1-1 to D1-8. It is seen that a single link is provided between each of the first-stage switches S1- and each of the second-stage switches S2-. In other embodiments of my invention, it is anticipated that more than one link may interconnect each of the first- and second-stage switches.

Figure 5:
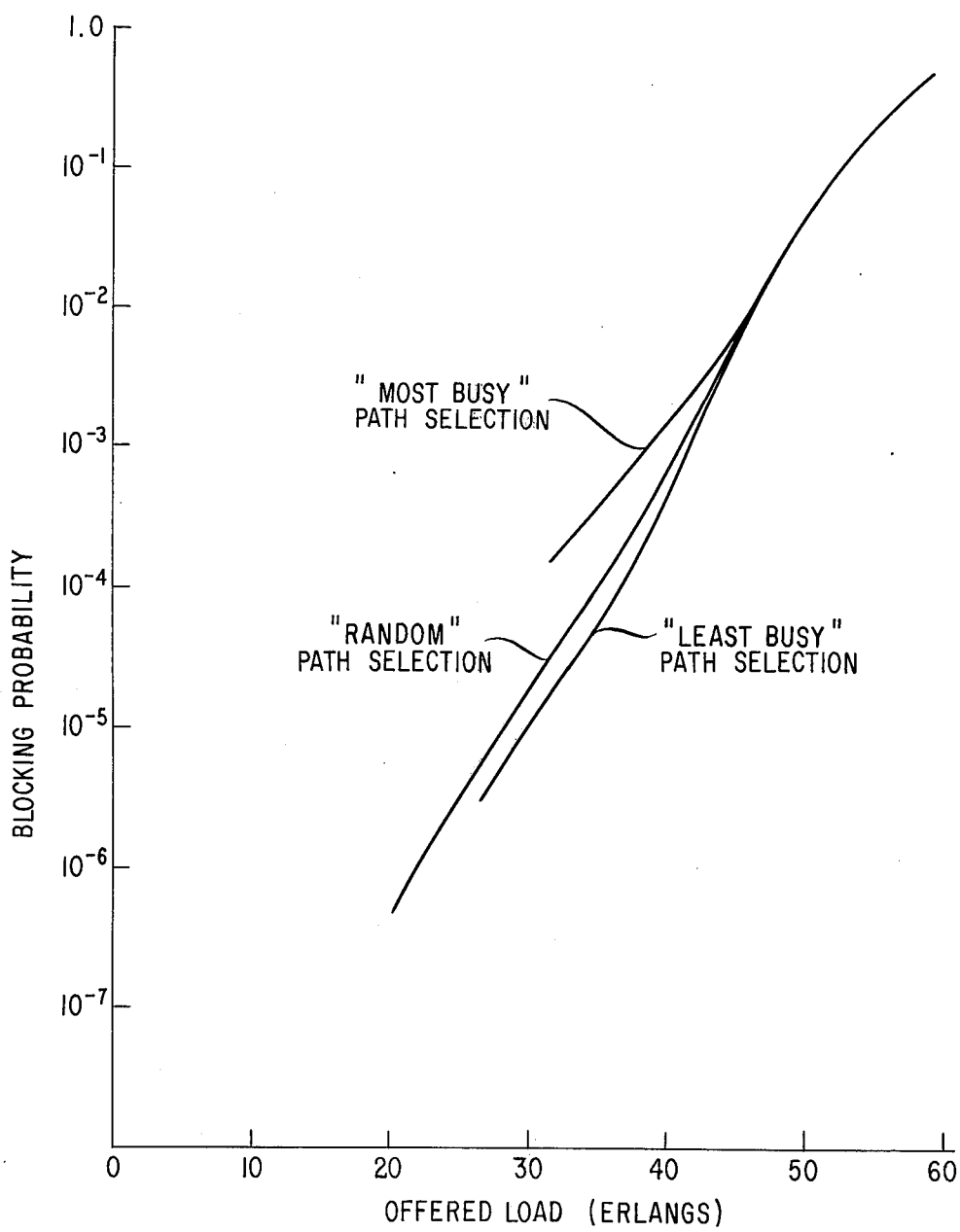
FIG. 5 illustrates the anticipated improved blocking performance utilizing my "least-busy" path selection arrangement.

FIG. 5 illustrates the improved blocking performance which is obtained in network CN utilizing my "least-busy" path selection as compared with the priorly utilized "most-busy" and random path selections. These graphs were prepared based upon monte carlo simulation techniques.

Figure 3:
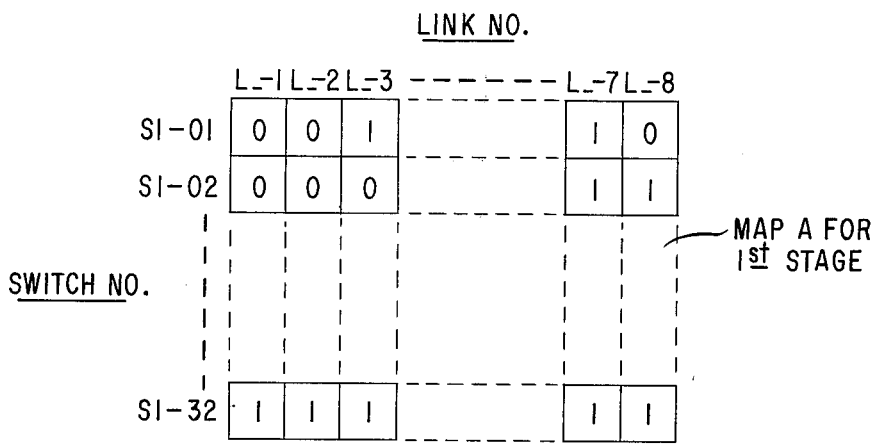
FIG. 3 illustrates three network maps which are utilized in my path selection and routing system.
Figure 3:
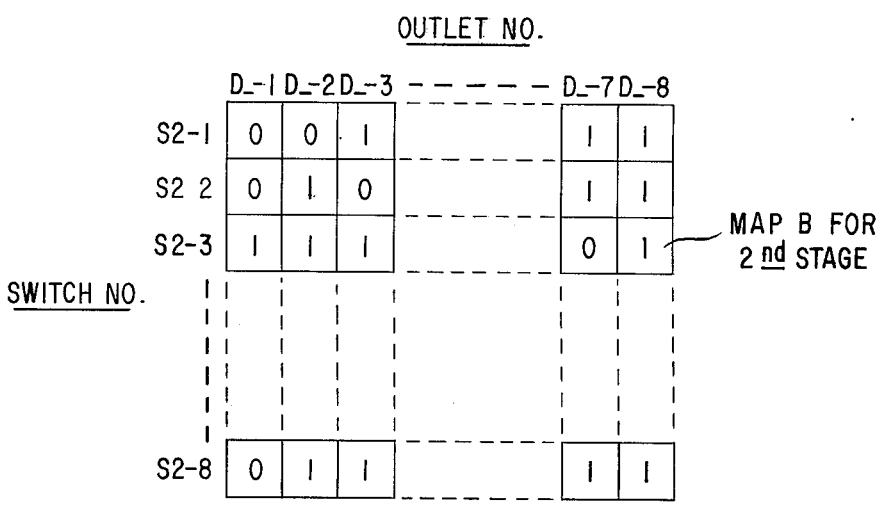
Figure 3:
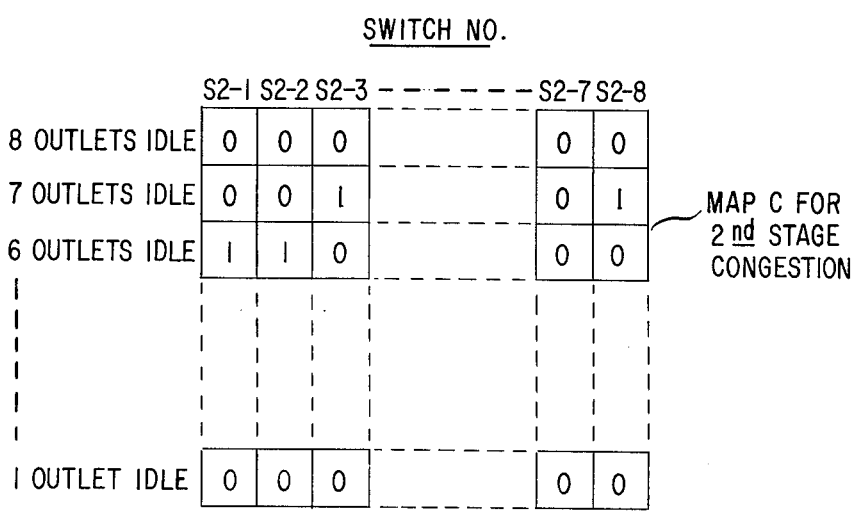

Turning now to FIG. 3, three maps are illustrated. Map A indicates the idle or busy status of each of the links associated with each of the first-stage switches. In this map, a 1 indicates an idle link and an 0 indicates a busy link. For example, for first-stage switch S1-01, links L01-1, L01-2, and L01-8 are busy and links L01-3 and L01-7 are idle.

Map B indicates the idle or busy status of the outlets associated with the second-stage switches. For example, outlet D8-1 associated with second-stage switch S2-8 is busy, whereas each of the other labeled outlets of this switch are idle. Maps A and B are well-known network map tables and similar maps are utilized in the TSPS processor for selecting paths and for controlling the establishment of connections in network TPN as described on page 2572 et seq. of the above-mentioned BSTJ. Similar network maps are also described in S. S. Karp Pat. No. 3,613,089, issued Oct. 12, 1971, and K. S. Dunlap et al. U.S. Pat. No. 3,281,539, issued Oct. 25, 1966. Maps A and B are updated in the course of normal call processing to reflect the actual busy-idle status of the hardware elements specified in these maps.

In accordance with this one preferred embodiment of my invention, a third map is generated to indicate the congestion level or the number of idle outlets of the second-stage switches. This congestion map is shown as map C in FIG. 3. The generation of this map will be described in detail hereinafter; however, this map can be easily generated by hardware or software by counting the number of 1s in each row of map B. The count for each row indicates the number of idle outlets in the switch associated with the row. For example, we will assume that switch S2-1 as indicated in map B has six idle outlets (i.e., six 1s). Thus, in map C, a 1 is inserted in the column labeled S2-1 in the row which indicates switches with 6 outlets idle. Thus each vertical column only has a single one inserted therein.

Reading map C, it is apparent that none of the second-stage switches have 8 outlets idle, but switches S2-3 and S2-8 each have 7 outlets idle. In accordance with the principles of my invention, if possible, either switch S2-3 or S2-8 will be utilized to establish the next connection. If, however, these two switches cannot be utilized, then those switches with 6 idle outlets will be considered. Sequentially each of the other second-stage switches is considered in its order of congestion, such that those switches with one idle outlet are considered last.

To summarize the above, a congestion map is generated and iteratively and least congested switches are considered for establishing a desired connection. Thus, as a first choice, the second-stage switches with eight outlets idle are utilized. As a second choice those second-stage switches with seven idle outlets are utilized and so on, reading down the rows of map C until finally those second-stage switches with only one idle outlet are considered.

Figure 4:
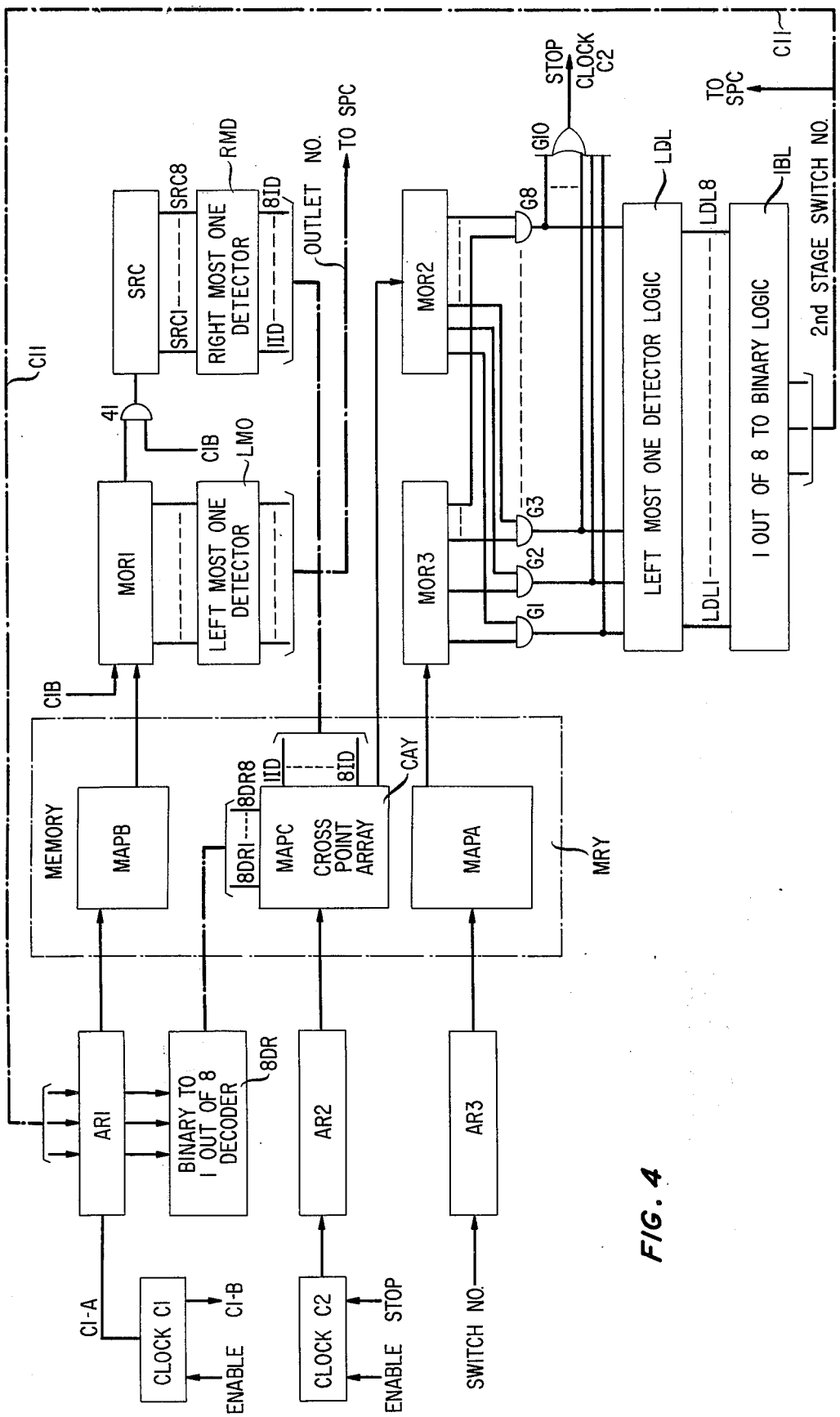
FIG. 4 schematically illustrates map generation circuitry and circuitry which implements my path selection system.

FIG. 4 illustrates one circuit which generates map C from map B and also illustrates one circuit utilized to implement my least-busy routing arrangement. The information generated by the circuitry of FIG. 4 specifies a second-stage switch and outlet in that switch, which are to be utilized for establishing the desired connection. This information is conveyed to processor SPC which generates the appropriate control information. This control information is conveyed to controller CN1 in FIG. 1 for controlling concentrator network CN to establish the desired connection. Controller CN1 operates in a manner substantially identical to controller TPN1 whose operation is described in the above-mentioned BSTJ.

Initially all registers and counters shown in FIG. 4 contain 0s. Each time a connection in network CN is established or broken-down, processor SPC enables clock C1. The clock provides a periodic HIGH signal in the form of a square wave on lead C1-A to register AR1 which is also a 3-bit binary counter. In response to the first HIGH signal over lead C1-A, register AR1 counts and therefore now contains the binary address 001 which is conveyed to memory MRY. In a well-known manner the addressed word, which is the first row of information in map B, is inserted into register MOR1. Thus, register MOR1 now contains the following binary information: 001...11. Clock C1 also provides periodic output signals over lead C1-B at much greater frequency than over lead C1-A. These signals cause the information in register MOR1 to be consecutively shifted out and applied to gate 41. The signals received over lead C1-B also energize gate 41 to strobe the information in the form of binary is into eight-stage shift register counter SRC. Each time a binary 1 is output from register MOR1, a binary 1 is inserted in register SRC. However when a 0 is output from register MOR1, a 1 is not inserted in register SRC, and the contents of register SRC are not shifted. After lead C1-B has gone HIGH eight times, each of the 8 bits in register MOR1 have been inserted, and register SRC now contains a number of is equal to the number of 1s in the original word in register MOR1.

Turning to FIG. 3, and assuming that each of the bit positions not shown in map B in the row labeled S2-1 are 1s (in other words assuming row S2-1 contains six 1-s and two 0s) then six 1s would have been shifted into register SRC. Register SRC would then provide HIGH outputs on the first six output leads to the rightmost one detector circuit RMD. Thus leads SRC1-SRC6 would be HIGH and leads SRC7 and SRC8 would be LOW. Circuit RMD comprises wellknown logic for detecting the rightmost 1 in a word and for providing a HIGH output on the single output lead associated with the detected rightmost 1. Thus, circuit RMD provides a HIGH output over lead 6ID. This lead indicates that the particular second-stage switch associated with the word retrived from map B has 6 idle outputs. The output leads 1ID-8ID respectively correspond to the 1-to-8 possible idle outlets for a given switch. Here lead 6ID associated with eight-by-eight crosspoint array CAY is energized.

To generate map C, shown in FIG. 3, the second-stage switch identity must also be known so that a 1 can be inserted in the proper column of the map. Binary-to-1-out-of-8 detector 8DR converts the binary address 001 in register AR1 to a 1-out-of-8 code and provides a HIGH signal only on lead 8DR1. The HIGH signal on lead 8DR1 energizes a vertical selection lead of crosspoint array CAY. Only the memory element having its vertical and horizontal selection leads concurrently energized will store a 1. Thus, since leads 8DR1 and 6ID are energized a 1 will be inserted in the first column of the third row of crosspoint array CAY. Turning again to FIG. 3, the inserted 1 is the 1 in the column designated S2-1 and the row designated "6 outlets idle."

This same procedure is repeated for each of the other rows of map B so that is are inserted in the appropriate locations of map C.

More specifically, clock C1 again enables lead C1-A and counter AR1 again increments its count so that the register now contains the binary word 010. Now the second row, associated with switch S2-2, is read out of map B into register MOR1. As described previously, the bits of the word in register MOR1 are consecutively shifted out and counted by register SRC. Detector RMD then provides the appropriate HIGH output which indicates the number of idle outputs associated with switch S2-2. This HIGH signal energizes the proper horizontal selector lead of array CAY. Decoder 8DR decodes the binary address 010 in register AR1 and provides a HIGH signal on output lead 8DR2 which enables the proper vertical selection lead of array CAY. Thus, for example, a 1 is inserted in the memory element at the intersection of the second column and third row of array CAY.

The preceding has described how the circuitry of FIG. 4 devices map C from map B. After each of the eight rows of map B has been addressed, output, and processed to generate map C, processor SPC then disables clock Cl and resets register AR1 to all 0s.

When a scanner (not shown) associated with processor SPC detects a service request on one of the communication lines terminated on a first-stage switch, the scanner indicates to the processor the identity of the calling line and the identity of the first-stage switch on which that line is terminated. Assume, for example, that a call is detected over communication line or path P1 of switch SL-01 in FIG. 2. At this time, processor SPC enables clock C2 and, concurrently, loads register AR3 with a binary word 0001 which indicates that the calling line is terminated on switch S1-01. IF switch S1-08 had been indicated, the binary word 0100 (i.e., binary 8) would have been loaded into register AR3.

Responsive to the loading of binary word 0001 into register AR3, the first row of map A is retrieved from memory MRY in a well-known fashion. The word 001...10 (FIG. 3, map A, fist row) is output into memory output register MOR3. As mentioned above, clock C2 was concurrently enabled and this clock provides a HIGH input to address register AR2 which is also a binary counter. Thus, register AR2 now contains the binary word 001, and, accodingly, the first row of map C in array CAY is output into register MOR2. Register MOR2 now contains the binary word 000...00 (FIG. 3, map C, first row). The binary words in register MOR3 and MOR2 are now compared on a bit-by-bit basis to ascertain if an idle link is available to one of the least-congested second-stage switches. More specifically, the first bit in each of the words in register MOR3 and MOR2 are ANDed together by gate G1, and each of the other bits in each register is respectively ANDed by gates G2-G8. Thus a logical product is formed between the words 001...10 and 000...00, which logical product is 000...00. Thus gates G1-G8 each provides LOW output indicating that no second-stage switches with eight idle outlets can be utilized.

Clock C2 now provides another HIGH signal to register AR2 which increments its present count to 010. Now, the second row of map C is output into register MOR2, and the logical product is formed between binary words 001...10 (register MOR2) and 001...01 (register MOR3). Gate G3 provides a HIGH output to indicate that the desired connection can be completed through switch S2-3. Gates G1-G8 respectively correspond to switches S2-1 to S2-8. Leftmost one detector logic LDL is a well-known circuit for detecting the leftmost 1 in a word input thereto, and for generating an output word with a 1 only in the bit position corresponding to the leftmost 1. Thus logic LDL provides LOW outputs on all its output leads except lead LDL3. IF more than one second-stage switch, with the same number of idle outlets had been available, then two or more is would have been input into logic LDL. By choosing the leftmost 1, logic LDL operates to choose among available second-stage switches having the same congestion. Of course, a random selection or other selection of second-stage switches having the same congestion could also be utilized.

The HIGH output of gate G3 also causes OR gate G10 to generate a HIGH output signal to stop clock C2. Thus, the other rows of map C are not consecutively output.

As described above, the rows of map C are output in order of increasing congestion and compared with the appropriate row output from map B only until a match occurs which indicates that a path is available through a second-stage switch.

Now that logic LDL has provided a HIGH output over lead LDL3, indicating the connection that can be established via switch S2-3, an idle outlet on this switch must now be chosen. More specifically, one-out-of-8-to-binary logic 1BL translates the word output from logic LDL into the binary output word 011, which output word is applied to register AR1 over cable C11. Thus the binary word 011 is inserted in register AR1, and, accordingly, the third row of map B is output into register MOR1. Thus the binary word 111...01 is now stored in register MOR1. Since the 1s indicate idle outlets, this call could be completed by establishing a connection over either outlets D3-1; D3-2; D3-3; or D3-8, but could not be completed over outlet D3-7 which is busy. Leftmost-one detector LMO detects the leftmost 1 and provides an output word having a 1 corresponding to the leftmost detected 1. Thus detector LMO provides the following output word 100...00 to processor SPC indicating that outlet $D_3$-1 has been selected. The word 010...00 would have indicated that outlet $D_3$-2 had been selected.

Since processor SPC already knows the identity of the calling line (p1), and the corresponding first-stage switch S1-01) and was informed of the selected second-stage switch (S2-3) by logic 1BL, and was also informed of a selected idle outlet on that switch (D3-1) by detector LMO, processor SPC then generates the appropriate order to control controller CN1 to establish the desired connection through network CN.

Illustrative Software Embodiment

As mentioned previously, maps A, B, and C can be updated under program control, and moreover, the selection of a path through a least congested second-stage switch can also be performed by a software arrangement. The following subroutines are written in PL/I, a well-known programming language which is, for example, extensively described in *A Guide to PL/I*, by *Pollack and Sterling* and published in 1969 by Holt, Rinehart and Winston, Inc. The operation of each subroutine is self-explanatory in view of its preamble which identifies all variables used therein, and the function performed thereby.

UPDATE-MAPS: PROCEDURE(S1NUMBER, S2NUMBER,DNUMBER,ACTION):
SUBROUTINE TO UPDATE THE THREE MAPS CORRESPONDING TO A TWO STAGE CONCENTRATOR CONSISTING OF THIRTY-TWO 16×8 FIRST-STAGE SWITCHES AND EIGHT 32×8 SECOND-STAGE SWITCHES. THE SUBROUTINE IS ENTERED WITH THE FIRST-STAGE SWITCH NUMBER (S1NUMBER), THE SECOND-STAGE SWITCH NUMBER (S2NUMBER), THE OUTLET NUMBER (DNUMBER), AND A VARIABLE (ACTION) INDICATING WHETHER A CONNECTION HAS BEEN MADE (ACTION = '1' B) OR BROKEN (ACTION='0' B). THE SUBROUTINE UPDATES THE FIRST-STAGE MAP (MAPA) THE SECOND-STAGE MAP (MAPB), AND THE CONGESTION MAP (MAPC).
DECLARE (S1NUMBER,S2NUMBER,DNUMBER) BINARY FIXED:
DECLARE (MAPA(32),MAPB(8),MAPC(8)) EXTERNAL BIT (8);
DECLARE ACTION BIT(1);
DECLARE R(8) INITIAL ('1'B,'01'B,'001'B,'0001'B, '00001'B,'000001'B,'0000001'B, '00000001'B) BIT(8);
IF ACTION
THEN MAPA(S1NUMBER)=MAPA(S1NUMBER) ∈-R(S2NUMBER);
ELSE MAPA(S1NUMBER)=MAPA(S1NUMBER) R(S2NUMBER);
IF ACTION
THEN MAPB(S2NUMBER)=MAPB(S2NUMBER) ∈-R(DNUMBER);
ELSE MAPB(S2NUMBER)=MAPB(S2NUMBER) R(DNUMBER);
N=9; DO I=1 to 8;
IF MAPB(S2NUMBER) ∈ R(I) THEN N=N−1;
END;
IF N<9 THEN MAPC(N) = MAPC(N) R(S2NUMBER)
IF ACTION
THEN MAPC(N−1) = MAPC(N−1) ∈ -R(S2NUMBER);
ELSE MAPC(N+1) = MAPC(N+1) ∈ -R(S2NUMBER);
RETURN: END UPDATE-MAPS;
HUNT-AND-ROUTE: PROCEDURE(S1 NUMBER(S2NUMBER,DNUMBER);
SUBROUTINE TO PATH HUNT (ASCERTAIN ALL ACCESSIBLE IDLE PATHS) AND ROUTE (SELECT ONE OF THESE PATHS) CONNECTIONS THROUGH A TWO-STAGE CONCENTRATOR CONSISTING OF THIRTY-TWO 16×8 FIRST-STAGE SWITCHES AND EIGHT 32×8 SECOND-STAGE SWITCHES. THE SUBROUTINE IS ENTERED WITH THE FIRST-STAGE SWITCH NUMBER (S1NUMBER) AND RETURNS WITH THE SECOND-STAGE SWITCH NUMBER (S2NUMBER) AND THE OUTLET NUMBER (DNUMBER) OF THE PATH SELECTED. IF NO PATH IS AVAILABLE, THE SUBROUTINE RE-

TURNS WITH S2NUMBER=0.
DECLARE (SINUMBER,S2NUMBER,DNUMBER)
   BINARY FIXED;
DECLARE   (MAPA(32),MAPB(8),MAPC(8))
   EXTERNAL BIT(8);
DECLARE (X,Y)   BIT(8);
X = MAPA (S1 NUMBER); DO I=1 TO 8;
Y = X ∈ MAPC(I);
IF Y THEN DO;
S2NUMBER=INDEX(Y,'1'B);
DNUMBER = INDEX(MAPB(S2NUMBER),'1B);
RETURN
END
END S2NUMBER=0; RETURN; END HUNT-AND-ROUTE;

The results of these subroutines provide path hunting and routing information which are utilized by processor SPC in a well-known manner to generate commands to network controllers to establish a connection to the selected outlet (DNUMBER) of the selected second stage switch (S2NUMBER).

SUMMARY

In summary, a routing system is disclosed for establishing connections through the least-congested second-stage switches of a concentrator to minimize call blocking. A congestion map is generated and the information in this congestion map is compared with other information indicating the idle accessible links. After a successful comparison, a least-congested second-stage switch which can be utilized is thereby chosen, and then an idle outlet on the selected switch is selected. With this information the processor generates the appropriate orders to establish the desired connection.

What is claimed is:

1. In a system having a two-stage network with a plurality of links connected between stages, each said stage comprising a plurality of switches, and said system also having a memory, logic circuits, and a network controller responsive to control information for controlling said network to establish a path through said network,
   the method of selecting, controlling, and establishing a path through said network comprising the steps of
   retrieving from said memory link information specifying accessible idle links,
   operating said logic circuits to generate congestion information specifying the congestion of each of said second stage switches,
   operating said logic circuits to logically combine said link information and said congestion information to generate path selection information specifying one of the least congested second-stage switches having an accessible idle link connected thereto,
   operating said logic circuits in accordance with said path selection information to generate control information, and
   applying said generated control informaton to said network controller to establish the path through said network via a first-stage switch, said specified one least-congested second-stage switch and said accessible idle link connected thereto.

2. In a system having a memory, registers, logic circuits, a two-stage network, and a network controller; said stages having links connected therebetween and each said stage comprising a plurality of switches; said network controller being responsive to control information for controlling said network to establish a path therethrough, and said memory storing current outlet information specifying the idle or busy condition of the outlets of the second-stage switches,
   the method of selecting, controlling and establishing paths in said network comprising the steps of
   storing in one of said registers the identity of a first-stage switch through which a connection is to be established,
   storing in one of said registers link information specifying the idle or busy condition of links associated with said identified first-stage switch,
   retrieving said current outlet information from said memory,
   operating said logic circuits in accordance with said retrieved current outlet information to generate congestion information based upon the number of idle outlets on said second-stage switches, those second-stage switches having the greatest number of idle outlets being the least congested,
   logically comparing said link information with said congestion information utilizing said logic circuits to identify a least-congested second-stage switch having an idle link connected thereto and also connected to said identified first-stage switch,
   further operating said logic circuits in accordance with the identity of said least-congested second-stage switch to generate control information, and
   applying said generated control information to said network controller to establish a path through said identified first-stage switch to said identified least-congested second-stage switch.

3. In a system having a memory, registers, logic circuits, a two-stage network, and a network controller; said stages having links connected therebetween and each said stage comprising a plurality of switches; said network controller being responsive to control information for controlling said network to establish paths therethrough, and said memory storing current outlet information specifying the idle or busy condition of the outlets of the second-stage switches;
   the method of selecting, controlling and establishing paths in said network comprising the steps of
   storing in one of said registers the identity of a first-stage switch through which a path is to be established,
   storing in one of said registers link information specifying the idle or busy condition of the links associated with said identified first stage,
   retrieving said current outlet information from said memory,
   operating said logic circuits in accordance with said retrieved current outlet information to generate congestion information specifying the number of idle outlets on each of said second-stage switches,
   logically comparing said link information in a predetermined sequence with said congestion information utilizing said logic circuits, to identify a second-stage switch with the greatest number of idle outlets and also having an idle link connected thereto, which link is connected to said identified first-stage switch
   further operating said logic circuits in accordance with the identity of said identified second stage switch to generate control information, and applying said generated control information to said network controller to establish a path through said identified first-stage switch to said selected idle outlets via an idle link and said identified second-stage switch.

4. In a communication system having a two-stage concentrator network and a processor with memory for controlling the establishment of connections in said network, said stages having links connected therebetween and each said stage comprising a plurality of switches, said memory including a first portion specifying the idle-busy condition of said links and also including a second portion specifying the idle-busy condition of the outlets on said second-stage switches; the method of controlling the establishing of a connection through said network comprising the steps of generating from said second portion, congestion information specifying the number of idle outlets on each of said second-stage switches, storing the identity of a first-stage switch through which a connection is to be established, retrieving from said first portion, link information specifying the idle-busy condition of the links connected to said identified first-stage switch, logically comparing said congestion information with said retrieved link information to identify one second-stage switch having the greatest number of idle outlets and connected to an idle link which is also connected to said identified first-stage switch, retrieving from said second portion, outlet information specifying the idle-busy condition of the outlets on said identified one second-stage switch, selecting an idle outlet on said identified one second-stage switch based upon said retrieved outlet information, and providing control information for controlling said network to establish a connection through said identified first-stage switch to said selected idle outlet via an idle link and said identified one second-stage switch.

5. In a communication system havingn a two-stage network, said stages having links connected therebetween and each of said stages comprising a plurality of switches, apparatus for selecting and controlling the establishment of connections in said network comprising means for generating congestion information specifying the number of idle outlets on each of said second-stage switches, those second-stage switches with the greatest number of idle outlets being the least congested, means for storing the identity of a first-stage switch, means for retrieving link information specifying the idle-busy condition of the links connected to said identified first-stage switch, means for logically comparing said link information and said congestion information to identify one of the least-congested second-stage switches having an idle link connected thereto and also connected to said identified first-stage switch, means for selecting an idle outlet on said one identified second-stage switch, and means for providing control information for controlling said network to establish a connection from said one identified first-stage switch to said selected idle outlet.

* * * * *